United States Patent
Park

(10) Patent No.: US 12,122,373 B2
(45) Date of Patent: Oct. 22, 2024

(54) DEVICE AND METHOD FOR PREVENTING BLIND SPOT COLLISION BASED ON VEHICLE-TO-VEHICLE COMMUNICATION

(71) Applicant: HYUNDAI MOBIS CO., LTD., Seoul (KR)

(72) Inventor: Ge O Park, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 259 days.

(21) Appl. No.: 17/680,677

(22) Filed: Feb. 25, 2022

(65) Prior Publication Data
US 2022/0297688 A1 Sep. 22, 2022

(30) Foreign Application Priority Data
Mar. 18, 2021 (KR) .................. 10-2021-0035051

(51) Int. Cl.
*B60W 30/095* (2012.01)
*B60Q 9/00* (2006.01)
(Continued)

(52) U.S. Cl.
CPC ......... *B60W 30/0956* (2013.01); *B60Q 9/008* (2013.01); *B60W 30/09* (2013.01); *B60W 50/0098* (2013.01); *G01S 15/58* (2013.01); *G01S 15/86* (2020.01); *G01S 15/931* (2013.01); *G06T 7/20* (2013.01); *G06V 20/58* (2022.01);
(Continued)

(58) Field of Classification Search
CPC ............. B60W 30/0956; B60W 30/09; B60W 50/0098; B60W 2050/0028; B60W 2420/42; B60W 2420/54; B60W 2554/402; B60W 2554/4041; B60W 2554/4042; B60W 2554/4043; B60W 2554/4044; B60W 2556/65; B60W 2050/143; B60W 2554/404; B60W 2554/805; B60W 2554/806; B60W 30/095; B60W 50/14; B60W 30/08; B60W 40/02; B60W 2556/45; B60Q 9/008; G01S 15/58; G01S 15/86; G01S 15/931; G06T 7/20; G06T 2207/30261; G06V 20/58; H04N 23/695;
(Continued)

(56) References Cited

U.S. PATENT DOCUMENTS

| 11,214,196 B1 * | 1/2022 | Hadir ................... H04N 23/695 |
| 2019/0114919 A1 * | 4/2019 | Stahl ..................... G08G 1/168 |
| 2021/0166564 A1 * | 6/2021 | Takaki ................... G08G 1/166 |

FOREIGN PATENT DOCUMENTS

| JP | 2008299676 A | * 12/2008 |
| KR | 20210095757 A | * 8/2021 |

* cited by examiner

*Primary Examiner* — Peter D Nolan
*Assistant Examiner* — Demetra R Smith-Stewart
(74) *Attorney, Agent, or Firm* — NSIP Law

(57) ABSTRACT

A device and method for preventing blind spot collision based on vehicle-to-vehicle communication. The method includes detecting a forward vehicle, requesting vehicle-to-vehicle communication with the forward vehicle, receiving image data and ultrasound data of the forward vehicle, analyzing information about a moving object in a blind spot formed by the forward vehicle, based on the image data and the ultrasound data, calculating a possibility of collision with the moving object based on the information about the moving object, and performing one or both of warning notification and collision avoidance control based on the possibility of collision.

8 Claims, 10 Drawing Sheets

(51) Int. Cl.
*B60W 30/09* (2012.01)
*B60W 50/00* (2006.01)
*G01S 15/58* (2006.01)
*G01S 15/86* (2020.01)
*G01S 15/931* (2020.01)
*G06T 7/20* (2017.01)
*G06V 20/58* (2022.01)
*H04N 5/232* (2006.01)
*H04N 23/695* (2023.01)

(52) U.S. Cl.
CPC ... *H04N 23/695* (2023.01); *B60W 2050/0028* (2013.01); *B60W 2420/403* (2013.01); *B60W 2420/54* (2013.01); *B60W 2554/402* (2020.02); *B60W 2554/4041* (2020.02); *B60W 2554/4042* (2020.02); *B60W 2554/4043* (2020.02); *B60W 2554/4044* (2020.02); *B60W 2556/65* (2020.02); *G06T 2207/30261* (2013.01)

(58) Field of Classification Search
CPC .......... H04N 7/18; H04N 23/57; G06N 20/00; B60Y 2300/08
See application file for complete search history.

DEVICE AND METHOD FOR PREVENTING BLIND SPOT COLLISION BASED ON VEHICLE-TO-VEHICLE COMMUNICATION

CROSS-REFERENCE TO RELATED APPLICATION

This application claims priority to and the benefit of Korean Patent Application No. 10-2021-0035051, filed on Mar. 18, 2021, the disclosure of which is incorporated herein by reference in its entirety.

TECHNICAL FIELD

The present disclosure relates to a device and method for preventing collision of a vehicle through vehicle-to-vehicle communication, and in particular, a device and method for preventing collision with a moving object in a blind spot by receiving and analyzing image and ultrasound data collected by a nearby vehicle.

BACKGROUND

The content described in this section merely provides background information on the present disclosure and does not constitute the prior art.

Recently, in the field of autonomous driving technology, research on technologies for reducing the risk of collision with objects in a blind spot is being actively conducted.

In general, collision avoidance devices are made based on information collected through a camera or sensor provided in a vehicle.

However, a collision avoidance method based on a camera or radar sensor has a problem in that a detection range for a surrounding object is narrow. For example, when an object outside an angle of view of the camera or an object outside a detection range of the radar sensor is not detected, a vehicle may collide with the object. In particular, when the object is a moving object such as a vehicle, a pedestrian, a kickboard, or a bicycle, it is difficult to reduce the risk of collision due to a blind spot only with the camera or radar sensor.

In addition, the collision avoidance method based on a camera or radar sensor may not properly detect a surrounding moving object depending on factors such as weather or external brightness. For example, a moving object on a road may be easily detected in clear weather, but may not be detected by the camera or the sensor in a dark environment or in bad weather conditions due to snow or rain.

The technology for preventing a collision of a own vehicle using only the information collected by the own vehicle uses only limited information sensed by the own vehicle, and thus can prevent only limited vehicle collision accidents. There is a problem in that a collision of the own vehicle due to a blind spot cannot be predicted only with limited information detected by the own vehicle.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a method for preventing blind spot collision based on vehicle-to-vehicle communication includes detecting a forward vehicle, requesting vehicle-to-vehicle communication with the forward vehicle, receiving image data and ultrasound data of the forward vehicle, analyzing information about a moving object in a blind spot formed by the forward vehicle, based on the image data and the ultrasound data, calculating a possibility of collision with the moving object based on the information about the moving object, and performing one or both of warning notification and collision avoidance control based on the possibility of collision.

The method may include analyzing the information about the moving object further based on image data and ultrasound data received from another forward vehicle.

The method may include predicting a future position of the moving object by using the information about the moving object and a prediction model; calculating a time to collision (TTC) of the vehicle with the moving object based on the future position of the moving object and driving information of the vehicle; and calculating the possibility of collision according to the time to collision.

The prediction model may be a model trained to output a future position of an object using position, velocity, direction, size and type of the object.

The method may include operating an ultrasonic sensor of the vehicle according to the possibility of collision; rotating an orientation of a camera of the vehicle toward the moving object according to the possibility of collision; and monitoring the moving object using the ultrasonic sensor and the camera.

The method may include calculating the possibility of collision based on both data collected by the vehicle and data received from the forward vehicle in a case in which the moving object is detected by the ultrasonic sensor and the camera.

In another general aspect, a device for preventing blind spot collision based on vehicle-to-vehicle communication includes a sensor unit configured to detect a forward vehicle, a communication unit configured to request vehicle-to-vehicle communication with the forward vehicle, and to receive image data and ultrasound data of the forward vehicle, a processing unit configured to analyze information about a moving object in a blind spot formed by the forward vehicle based on the image data and the ultrasound data, and to calculate a possibility of collision with the moving object based on the information about the moving object, and a control unit configured to perform one or both of warning notification and collision avoidance control according to the possibility of collision.

The processing unit may be configured to analyze the information about the moving object further based on image data and ultrasound data received from another forward vehicle.

The processing unit may be configured to predict a future position of the moving object by using the information about the moving object and a prediction model; calculate a time to collision (TTC) of the vehicle with the moving object based on the future position of the moving object and driving information of the vehicle; and calculate the possibility of collision according to the time to collision.

The sensor unit may be configured to: operate an ultrasonic sensor of the vehicle according to the possibility of collision; rotate an orientation of a camera of the vehicle toward the moving object according to the possibility of collision; and monitor the moving object using the ultrasonic sensor and the camera.

The processing unit may be configured to calculate the possibility of collision based on both data collected by the vehicle and data received from the forward vehicle in a case in which the moving object is detected by the ultrasonic sensor and the camera.

Other features and aspects will be apparent from the following detailed description, the drawings, and the claims.

DETAILED DESCRIPTION

Technical Problem

Figure 1:
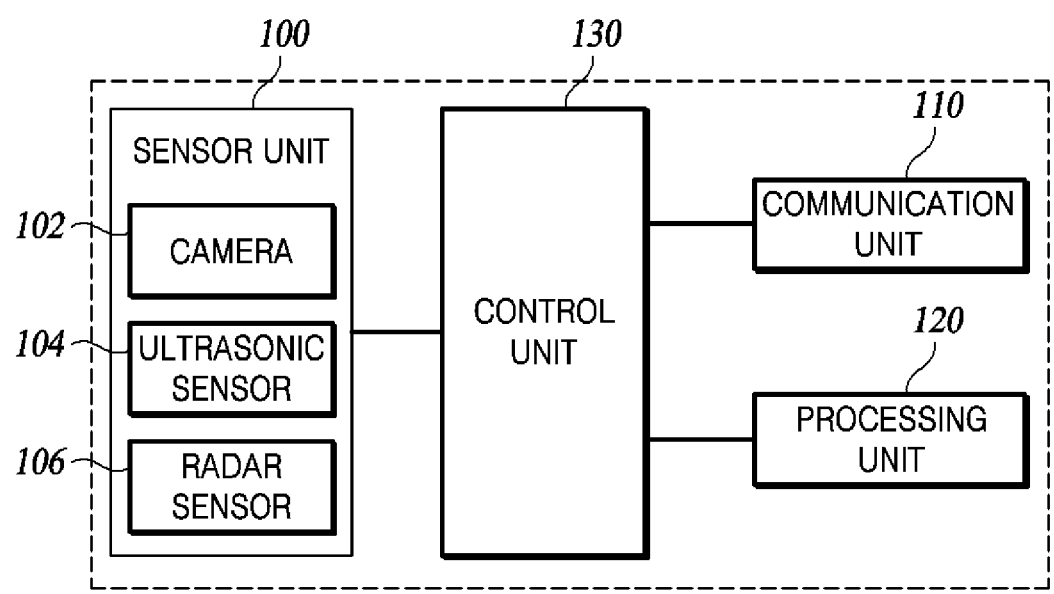
FIG. 1 is a block diagram illustrating a configuration of a collision avoidance device according to one embodiment of the present disclosure.

In view of the above, the present disclosure provides a collision avoidance device and method for preventing a collision of a vehicle with a moving object which may occur when the moving object in a forward blind spot is not detected due to a limited detection range of a camera or a radar sensor.

Further, the present disclosure provides a collision avoidance device and method for reducing the possibility of collision of a vehicle with a moving object by detecting the moving object in a blind spot using information about the blind spot collected by a plurality of surrounding vehicles.

In addition, the present disclosure provides a collision avoidance device and method for preventing a collision of a vehicle with a moving object by accurately predicting a movement of the moving object and a time to collision of the vehicle with the moving object using a machine learned prediction model.

Furthermore, the present disclosure provides a collision avoidance device and method for remarkably lowering the possibility of collision of a vehicle with a moving object by using an ultrasonic sensor and monitoring a blind spot by intensively focusing the camera on the blind spot while driving as well as parking.

Advantageous Effects

As described above, according to one embodiment of the present disclosure, it is possible to prevent a collision of a vehicle with a moving object in a blind spot by receiving and analyzing blind spot information collected by surrounding vehicles through vehicle-to-vehicle communication. In particular, the cost for collision avoidance may be reduced by utilizing widely available cameras and ultrasonic sensors without installation of additional hardware or software in surrounding vehicles.

By detecting a moving object in a blind spot using the information about the blind spot collected by a plurality of surrounding vehicles, the possibility of collision of a vehicle with the moving object can be significantly reduced.

According to another embodiment of the present disclosure, by accurately predicting a movement of the moving object and a time to collision of the vehicle with the moving object using the machine learned prediction model, the possibility of collision with the moving object can be significantly reduced.

According to another embodiment of the present disclosure, it is possible to significantly reduce the possibility of collision of a vehicle with a moving object by using the ultrasonic sensor and monitoring a blind spot by intensively focusing the camera on the blind spot while driving as well as parking.

DESCRIPTION

Hereinafter, some embodiments of the present disclosure are described with reference to the drawings. It should be noted that in giving reference numerals to components of the accompanying drawings, the same or equivalent components are denoted by the same reference numerals even when the components are illustrated in different drawings. In describing the present disclosure, when determined that a detailed description of related known functions or configurations may obscure the subject matter of the present disclosure, the detailed description thereof has been omitted.

In addition, in describing the components of the present disclosure, terms such as first, second, A, B, (a), (b), etc. may be used. These terms are used only in order to distinguish any component from other components, and features, sequences, or the like, of corresponding components are not limited by these terms. Throughout the present specification, unless explicitly described to the contrary, "including" and "comprising" any components should be understood to imply the inclusion of other elements rather than the exclusion of any other elements. A term, such as "part," "module," or the like described in the specification, means a unit of processing at least one function or operation and may be implemented as hardware or software or a combination of hardware and software. When a component, device, element, or the like of the present disclosure is described as having a purpose or performing an operation, function, or the like, the component, device, or element should be considered herein as being "configured to" meet that purpose or to perform that operation or function.

Hereinafter, it is premised that the forward vehicle is in a stationary state, such as a parked state, or that a relative speed of the forward vehicle is close to zero in relation to a vehicle equipped with a collision avoidance device of the present disclosure. In this case, the effect of reducing the possibility of collision by the collision avoidance device and method according to the present disclosure may be maximized.

FIG. 1 is a block diagram illustrating a configuration of a collision avoidance device according to one embodiment of the present disclosure.

Referring to FIG. 1, the collision avoidance device 10 includes a sensor unit 100, a communication unit 110, a processing unit 120, and a control unit 130. The collision avoidance device 10 may further include a component for measuring and providing information on driving of a vehicle. For example, the collision avoidance device 10 may further include a global positioning system (GPS), a navigation system, an inertial measurement device, and an antenna. The processing unit 120 and the control unit 130 may be implemented with one or more processors and one or more memories. The collision avoidance device 10 may be mounted on a vehicle.

The sensor unit 100 is a component that detects a forward vehicle.

The sensor unit 100 includes a camera 102 and an ultrasonic sensor 104. The sensor unit 100 may further include a radar sensor 106.

The sensor unit 100 may detect a forward vehicle by using the camera 102 or the radar sensor 106 while the vehicle equipped with the sensor unit 100 is driving.

The camera 102 may be a camera of a black box installed in a vehicle for accident recording.

Meanwhile, the ultrasonic sensor 104 may operate or sleep according to a possibility of collision of the vehicle with a moving object.

According to one embodiment of the present disclosure, the sensor unit 100 may operate the ultrasonic sensor 104 of the vehicle when the possibility of collision of the vehicle with a moving object calculated by the processing unit 120 is higher than a preset value, adjust an orientation of the camera 102 toward the moving object, and monitor the moving object using the camera 102 and the ultrasonic sensor 104.

The communication unit 110 is a component that requests vehicle-to-vehicle communication to a forward vehicle and receives image data and ultrasound data of the forward vehicle.

The communication unit 110 may receive image data and ultrasound data of a forward vehicle from the forward vehicle or a roadside device.

As one embodiment, the communication unit 110 may transmit a wake-up signal to the forward vehicle. When the engine of the forward vehicle is turned off or in a power saving mode, a camera, an ultrasonic sensor, and a communication unit in the forward vehicle may be activated by the wake-up signal. As another embodiment, the camera and the ultrasonic sensor in the forward vehicle may always be operated, and only the communication unit of the forward vehicle may be activated by the wake-up signal. The forward vehicle may transmit image data and ultrasound data according to the wake-up signal and the vehicle-to-vehicle communication request.

The communication unit 110 performs wireless communication with the forward vehicle. Wireless communication methods include VANET (vehicular ad hoc network), WAVE (Wireless Access in Vehicular Environments), DSRC (Dedicated Short Range Communication), CALM (Communication Access in Land Mobile), V2X (Vehicle-to-Everything), and the like, but the communication unit 110 may include any communication method having a low delay and high efficiency for information exchange between vehicles and between a vehicle and an infrastructure.

The processing unit 120 is a component that analyzes information on a moving object in a blind spot formed by the forward vehicle based on image data and ultrasound data received from the forward vehicle, and calculates the possibility of collision of the vehicle with the moving object based on the information on the moving object.

According to one embodiment of the present disclosure, when there are a plurality of forward vehicles, the processing unit 120 may analyze information on the moving object based on image data and ultrasound data received from each of the forward vehicles through the communication unit 110. The processing unit 120 may analyze the information about the moving object based on image data and ultrasound data received from one forward vehicle, and image data and ultrasound data received from another forward vehicle. The one embodiment will be described in detail with reference to FIG. 3.

According to one embodiment of the present invention, the processing unit 120 may predict a future position of the moving object by using the information on the moving object and a prediction model, and calculate a time to collision of the vehicle with the moving object based on the predicted position of the moving object and the driving information of the vehicle. Then, the processing unit 120 may calculate a possibility of collision with the moving object based on the time to collision.

Specifically, the processing unit 120 may predict the future position of the moving object using the moving object information and the prediction model. Here, the moving object information includes position, speed, direction, size, and type of the object. The prediction model refers to a machine learning model that outputs the future position of the moving object from the position, speed, direction, size, and type of the moving object using training data. The prediction model may output the future position of the moving object for each time. The type of moving object may include a person, an animal, a kickboard, a bicycle, a two-wheeled vehicle, and the like.

The processing unit 120 may calculate a time to collision (TTC) of the vehicle with the moving object based on the future position of the moving object and driving information of the vehicle. Here, the driving information of the vehicle includes at least one of position, speed, direction, size, type, and distance to a forward vehicle, acceleration information, braking information, a predicted route, a route history, and a yaw rate of the vehicle.

The possibility of collision calculated by the processing unit 120 may increase as the time to collision decreases, and the possibility of collision may decrease as the time to collision increases. In addition, the processing unit 120 may calculate the possibility of collision considering both the time to collision and driving information of the vehicle. For example, even if the time to collision is sufficient, when the vehicle speed is high, the possibility of collision may increase.

According to another embodiment of the present disclosure, when the ultrasonic sensor 102 operates according to the possibility of collision, and when a moving object is detected by the camera 102 and the ultrasonic sensor 104, the processing unit 120 may recalculate the possibility of collision of a vehicle based on both the data collected by the camera 102 and the ultrasonic sensor 104 and the data received from a forward vehicle through the communication unit 110. In this case, the information collected by the camera 102 and the ultrasonic sensor 104 of the vehicle may be treated with high priority.

On the other hand, when a moving object is detected by the camera 102 and the ultrasonic sensor 104, the processing unit 120 may analyze information on the moving object only with the data collected by the vehicle. In this case, the processing unit 120 may predict the future position of the moving object and calculate the possibility of collision using the moving object information analyzed based on the data collected by the vehicle and the prediction model.

The control unit 130 is a component that performs warning notification or collision avoidance control according to possibility of collision. Further, the control unit 130 controls overall operations of the sensor unit 100, the communication unit 110, and the processing unit 120.

The control unit 130 may provide only a warning notification to the driver when the possibility of collision is low. Conversely, when the possibility of collision is high, the control unit 130 may perform collision avoidance control by controlling the speed and direction of the vehicle. The control unit 130 may simultaneously perform warning notification and collision avoidance control. For example, the control unit 130 may perform collision avoidance control when the possibility of collision recalculated after performing a warning notification according to the possibility of collision is high due to driving of the vehicle.

The warning notification of the control unit 130 may be provided to the driver through visual information or auditory information.

FIGS. 2A, 2B, 2C, 2D and 2E are exemplary diagrams for explaining the collision avoidance method according to one embodiment of the present disclosure.

Referring to FIGS. 2A, 2B, 2C, 2D and 2E, a vehicle 200, a camera detection range 202, and an ultrasonic sensor detection range 204, a first forward vehicle 210, a second forward vehicle 215, and a moving object 220 are shown.

Figure 2A:
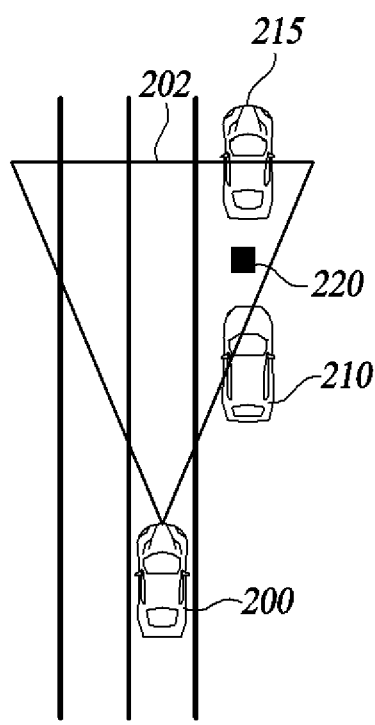
FIGS. 2A, 2B, 2C, 2D and 2E are exemplary diagrams for explaining a collision avoidance method according to one embodiment of the present disclosure.

In FIG. 2A, the vehicle 200 equipped with the collision avoidance device detects a forward vehicle using the camera while driving. In this case, the moving object 220 is not detected by the vehicle 200 due to the first forward vehicle 210.

Figure 2B:
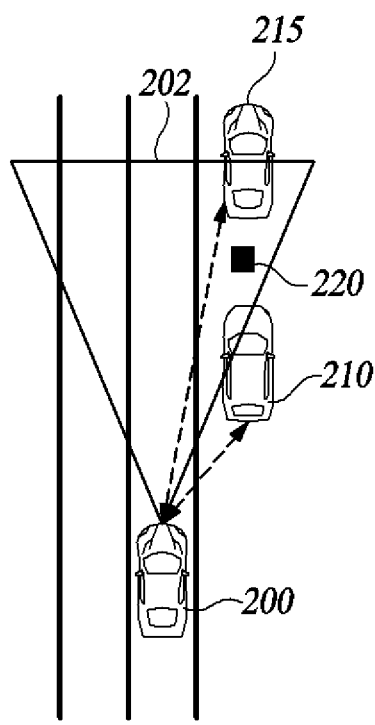

In FIG. 2B, vehicle 200 requests vehicle-to-vehicle communication to the first forward vehicle 210. When the vehicle 200 detects the second forward vehicle 215, it also requests vehicle-to-vehicle communication to the second forward vehicle 215. The first forward vehicle 210 and second forward vehicle 215 transmit image data and ultrasound data to the vehicle 200 according to the received vehicle-to-vehicle communication request.

Figure 2C:
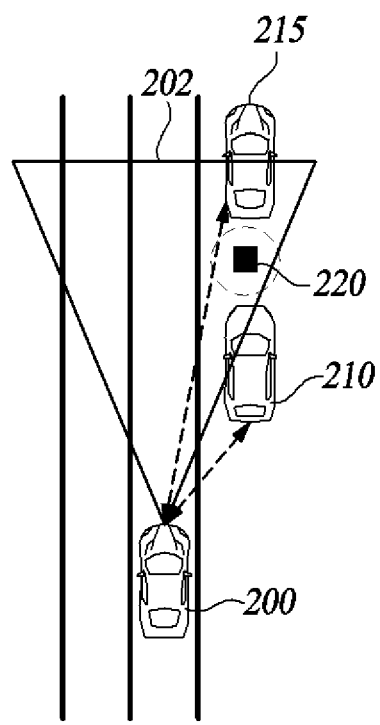

In FIG. 2C, the vehicle 200 analyzes information on the moving object 220 in the blind spot based on the received image data and ultrasound data, and calculates the possibility of collision with the moving object 220.

Figure 2D:
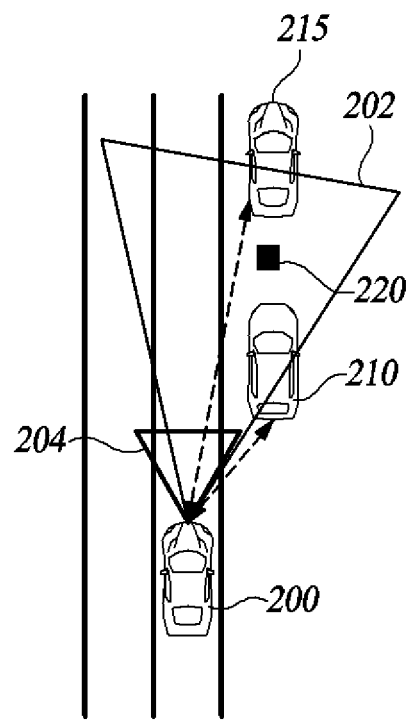

In FIG. 2D, when the possibility of collision is higher than a preset value, the vehicle 200 detects an object within the ultrasonic sensor detection range 204 by operating the ultrasonic sensor, and rotating the orientation of the camera so that the camera detection range 202 is moved toward the moving object 220. That is, the vehicle 200 monitors the moving object 220 intensively.

Figure 2E:
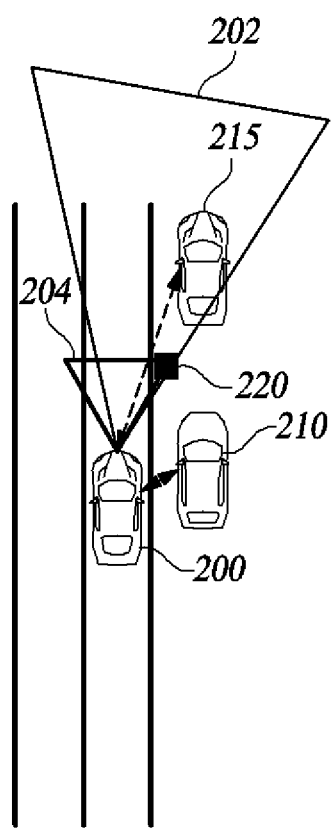

In FIG. 2E, when the moving object 220 is detected within the camera detection range 202 and the ultrasonic sensor detection range 204, the vehicle 200 calculates a possibility of collision with the moving object 220 and performs warning notification or collision avoidance control. In this case, the vehicle 200 may calculate the possibility of collision using only the data collected by vehicle 200, or may calculate the possibility of collision using not only the data collected by vehicle 200 but also data received from the first forward vehicle 210 and the second forward vehicle 215.

Figure 3:
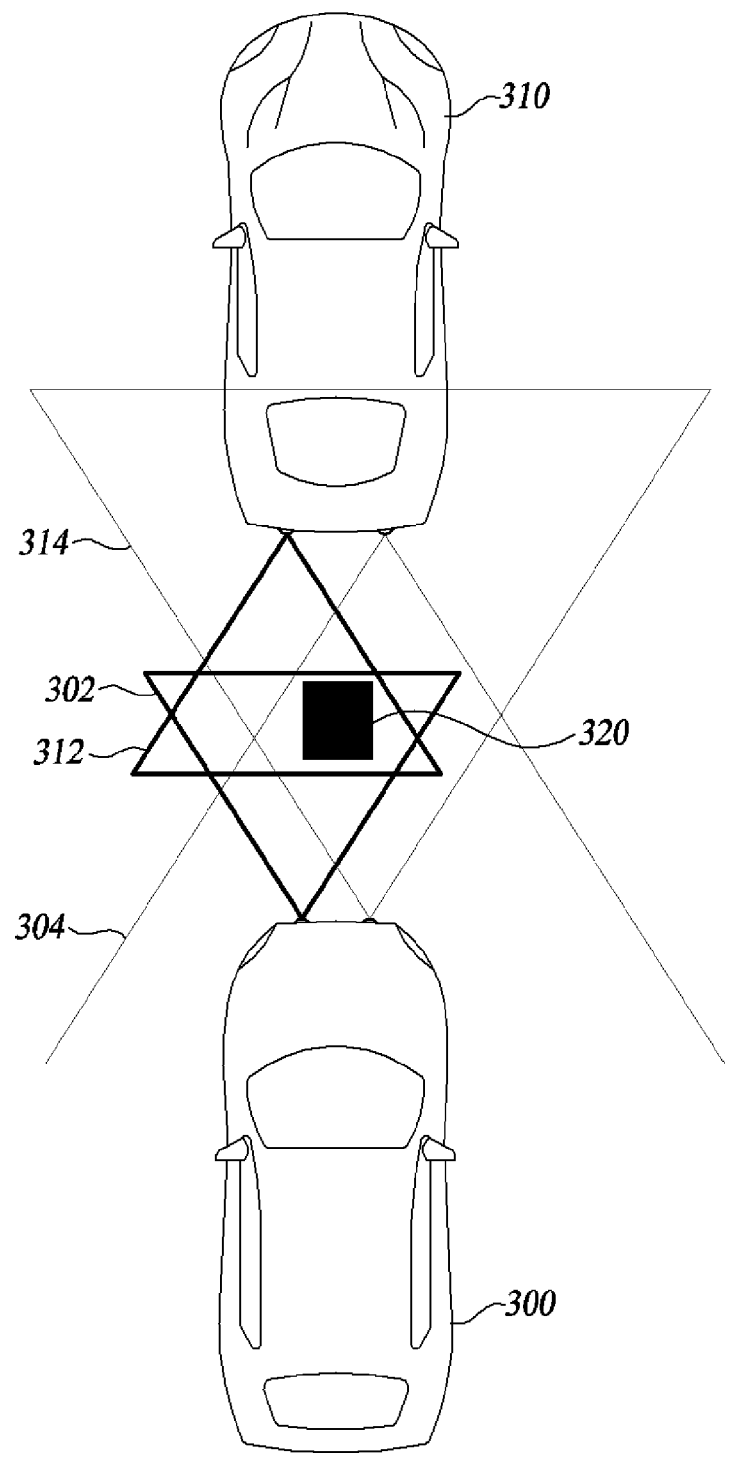
FIG. 3 is an exemplary diagram for explaining a method of analyzing a moving object based on data received from a plurality of surrounding vehicles according to one embodiment of the present disclosure.

FIG. 3 is an exemplary diagram for explaining a method of analyzing a moving object based on data received from a plurality of surrounding vehicles according to one embodiment of the present disclosure.

Referring to FIG. 3, a first forward vehicle 300, a first ultrasonic sensor detection range 302, a first camera detection range 304, a second forward vehicle 310, a second ultrasonic sensor detection range 312, and a second camera detection range 314 and an object 320 are shown.

The collision avoidance device may receive ultrasound data corresponding to the first ultrasound sensor detection range 302 and image data corresponding to the first camera detection range 304 from the first forward vehicle 300. Further, the collision avoidance device may receive ultrasound data corresponding to the second ultrasound sensor detection range 312 and image data corresponding to the second camera detection range 314 from the second forward vehicle 310.

The collision avoidance device may analyze the object 320 based on the image data and the ultrasound data received from both of the first forward vehicle 300 and the second forward vehicle 310. Accordingly, the collision avoidance device can accurately analyze the position, size, speed, direction, type, etc. of the object.

Figure 4A:
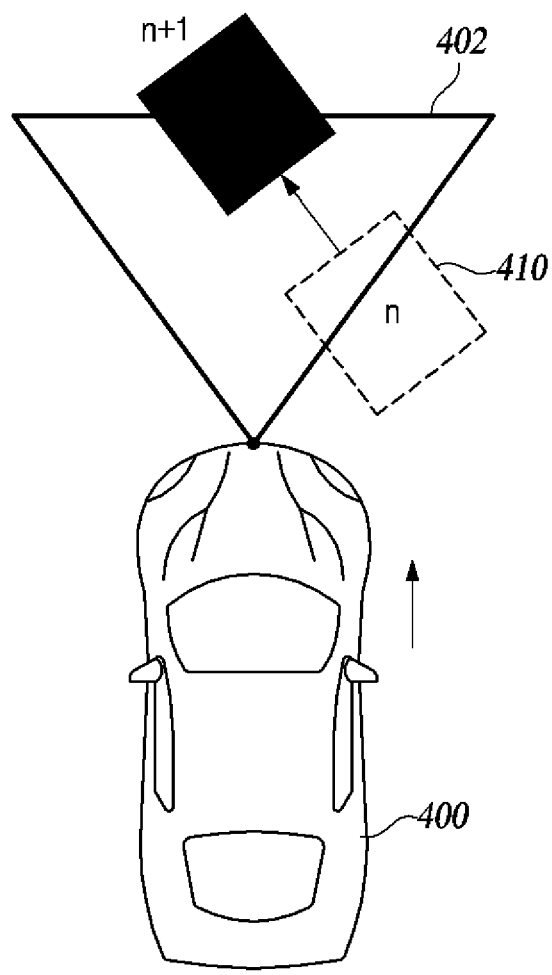
FIG. 4A is an exemplary diagram for explaining a moving object analysis using a machine learning prediction model according to one embodiment of the present disclosure.

FIG. 4A is an exemplary diagram for explaining a moving object analysis using a machine learning prediction model according to one embodiment of the present disclosure.

Referring to FIG. 4A, a vehicle 400, an object 410 and a sensor detection range 402 are shown.

The vehicle 400 may analyze the object 410 within the sensor detection range 402, and predict a future position of the object 410 using information of the object 410 and a prediction model.

The vehicle 400 may input a position, a speed, a direction, a size, and a type of the object 410 into the prediction model, and obtain the future position of the object 410 over time from the prediction model.

To this end, the prediction model is machine-learned to output a future position of an object when the prediction model receives a position, a speed, a direction, a size, and a type of the object. For example, the prediction model may include a neural network, and may be trained using information of the object 410 and a future position of the object 410 as training data.

Figure 4B:
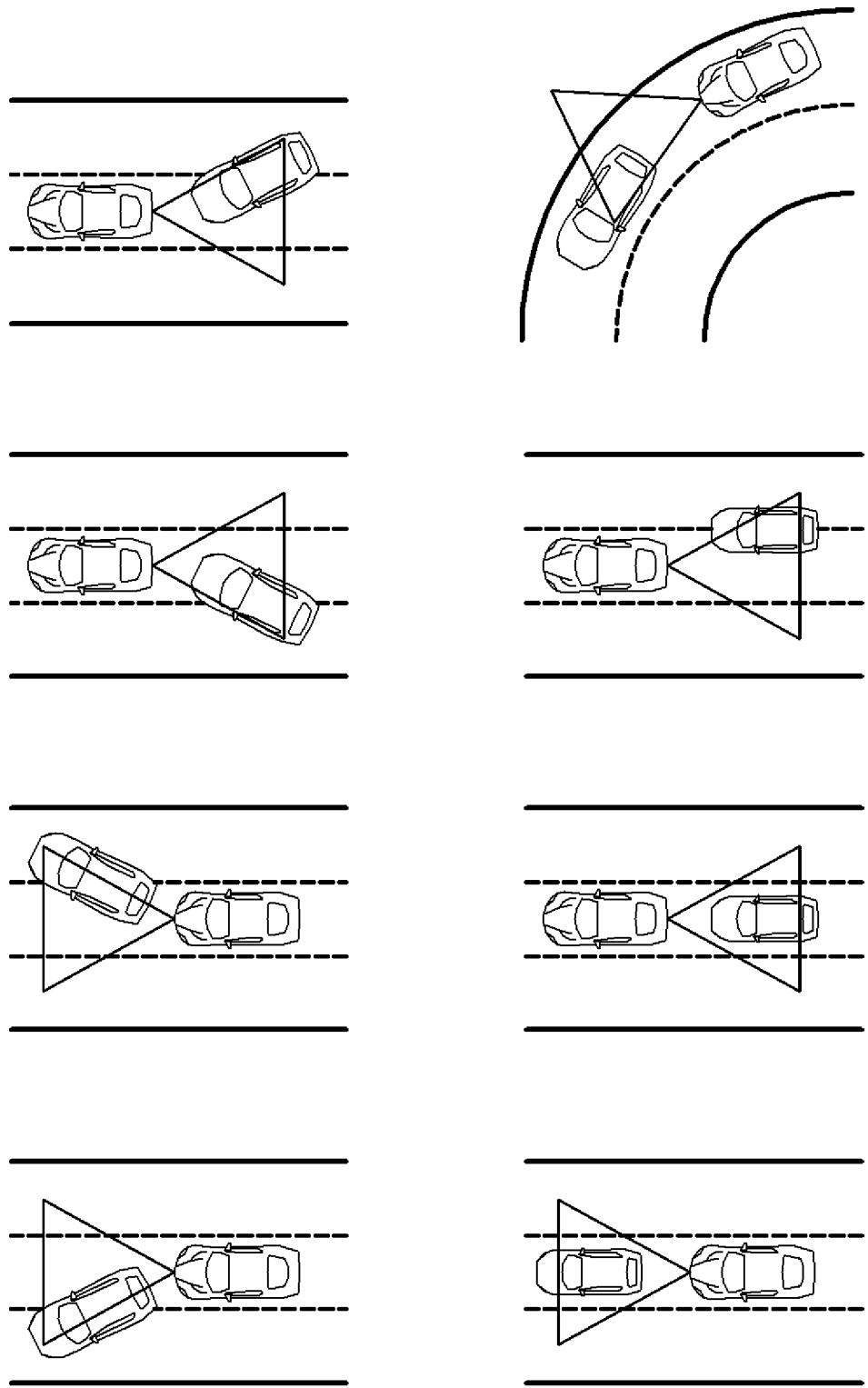
FIG. 4B is an exemplary diagram for explaining training data of a machine learning prediction model according to one embodiment of the present disclosure.

FIG. 4B is an exemplary diagram for explaining training data of the machine learning prediction model according to one embodiment of the present disclosure.

Referring to FIG. 4B, the training data of the prediction model may be data collected according to various situations. For example, FIG. 4B shows a case where the forward vehicle turns left, a case where the forward vehicle turns right, a case where the vehicle behind enters the same lane from the left rear lane, and a case where the vehicle behind enters the same lane from the right rear lane. Data collected about a moving object other than a vehicle may also be used as training data.

The training data of the prediction model may include a position, a speed, a direction, a size, a type, and a future position of each of objects according to various situations. The prediction model is machine-learned to output the future position of each of the objects when the prediction model receives the position, the speed, the direction, the size, and the type of the objects.

Figure 5:
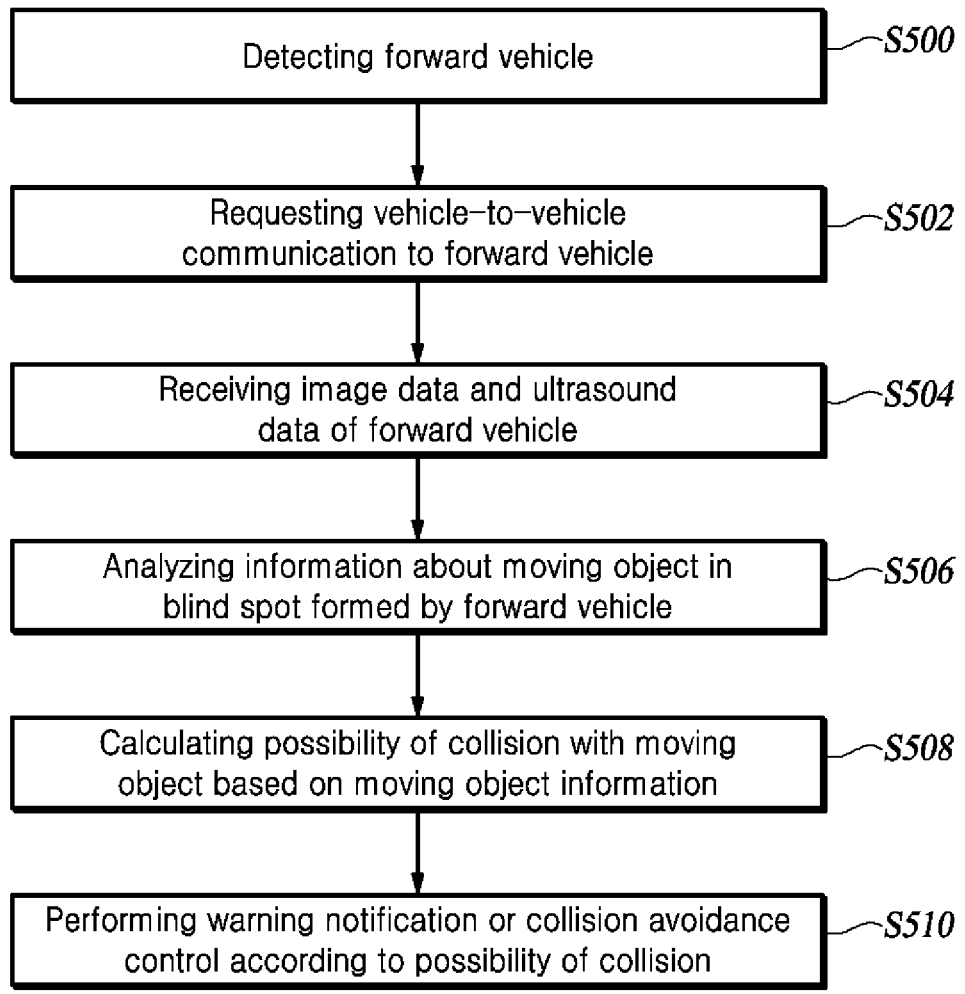
FIG. 5 is a flowchart illustrating a collision avoidance method according to one embodiment of the present disclosure.

FIG. 5 is a flowchart illustrating a collision avoidance method according to one embodiment of the present disclosure.

Referring to FIG. 5, the collision avoidance device (not shown) detects a forward vehicle (S500). The collision avoidance device may detect a forward vehicle using a camera or a radar sensor.

The collision avoidance device requests vehicle-to-vehicle communication to the forward vehicle (S502). The collision avoidance device may transmit a wake-up signal to the forward vehicle together.

According to one embodiment of the present disclosure, when there are a plurality of forward vehicles, vehicle-to-vehicle communication may be requested to the plurality of forward vehicles.

The collision avoidance device receives image data and ultrasound data of the forward vehicle (S504). When there are a plurality of forward vehicles, the collision avoidance device may receive image data and ultrasound data from each of the forward vehicles.

The collision avoidance device analyzes information about a moving object in a blind spot formed by the forward vehicle based on the image data and the ultrasound data (S506). Here, the moving object information includes the position, speed, direction, size and type of the moving object.

According to one embodiment of the present disclosure, when there are a plurality of forward vehicles, the collision avoidance device may analyze the moving object information based on all of the image data and the ultrasound data received from each of the forward vehicles.

The collision avoidance device calculates a possibility of collision with the moving object based on the moving object information (S508). The collision avoidance device may predict a future position of the moving object, and calculate a time of collision (TTC) of the vehicle with the moving object based on the future position of the moving object and driving information of the vehicle. Then, the collision avoidance device may calculate the possibility of collision based on the time to collision.

According to one embodiment of the present disclosure, the collision avoidance device may predict the future position of the moving object using the moving object information and the prediction model. Here, the prediction model is a model trained to output a future position of object from a position, speed, size, and type of an object.

According to one embodiment of the present disclosure, the collision avoidance device may operate an ultrasonic sensor of the vehicle according to the possibility of collision, rotate the orientation of the camera toward the moving object according to the possibility of collision, and monitor the moving object using the ultrasonic sensor and the camera. When a moving object is detected by the ultrasonic sensor and the camera, the collision avoidance device may recalculate the possibility of collision based on both data collected by the vehicle and data received from the forward vehicle.

The collision avoidance device performs warning notification or collision avoidance control based on the possibility of collision (S510).

Although it is described that steps S500 to S510 are sequentially executed in FIG. 5, this is merely illustrative of the technical idea of one embodiment of the present disclosure. In other words, since an ordinary skilled person in the art to which one embodiment of the present disclosure pertains may make various modifications and changes by changing the order described in FIG. 5 without departing from the essential characteristics of the present disclosure or performing in parallel one or more of steps S500 to S510, FIG. 5 is not limited to a time-series order.

Meanwhile, the steps illustrated in FIG. 5 may be implemented as computer-readable codes on a computer-readable recording medium. The computer-readable recording medium includes all types of recording devices in which data readable by a computer system is stored. That is, the computer-readable recording medium includes non-transitory media such as ROM, RAM, CD-ROM, magnetic tape, floppy disk, and optical data storage device. In addition, the computer-readable recording medium is distributed in a network-connected computer system so that the computer-readable code can be stored and executed in a distributed manner.

In addition, the components of the present disclosure may use an integrated circuit structure such as a memory, a processor, a logic circuit, a look-up table, and the like. This integrated circuit structure implements each of the functions described herein through the control of one or more microprocessors or other control devices. In addition, the components of the present disclosure may be specifically implemented by a part of a program or code including one or more executable instructions for performing a specific logical function and executed by one or more microprocessors or other control devices. In addition, the components of the present disclosure may include or may be implemented by a central processing unit (CPU), a microprocessor, etc. that perform respective functions. In addition, the components of the present disclosure may store instructions executed by one or more processors in one or more memories.

Although embodiments of the present disclosure have been described for illustrative purposes, those having ordinary skill in the art should appreciate that various modifications, additions, and substitutions are possible, without departing from the idea and scope of the present disclosure. Therefore, embodiments of the present disclosure have been described for the sake of brevity and clarity. The scope of the technical idea of the present embodiments is not limited by the illustrations. Accordingly, those having ordinary skill should understand the scope of the present disclosure should not be limited by the above explicitly described embodiments but by the claims and equivalents thereof.

What is claimed is:

1. A collision avoidance method performed by a vehicle, the method comprising:
   detecting a forward vehicle;
   requesting vehicle-to-vehicle communication with the forward vehicle;
   receiving image data and ultrasound data of the forward vehicle;
   analyzing information about a moving object not detected by the vehicle and hidden in a blind spot formed by the forward vehicle based on the image data and the ultrasound data;
   calculating a possibility of collision with the moving object based on the information about the moving object;
   operating an ultrasonic sensor of the vehicle according to the possibility of collision;
   rotating an orientation of a camera of the vehicle toward the moving object according to the possibility of collision;
   monitoring the moving object using the ultrasonic sensor and the camera; and
   performing one or both of warning notification and collision avoidance control based on the possibility of collision,
   wherein the calculating of the possibility of collision comprises recalculating the possibility of collision with the moving object based on both data collected by the vehicle and data received from the forward vehicle when the moving object is detected by the ultrasonic sensor and the camera.

2. The collision avoidance method of claim 1, wherein the analyzing of the information about the moving object comprises:
   analyzing the information about the moving object further based on image data and ultrasound data received from another forward vehicle.

3. The collision avoidance method of claim 1, wherein the calculating of the possibility of collision comprises:

predicting a future position of the moving object by using the information about the moving object and a prediction model;

calculating a time to collision (TTC) of the vehicle with the moving object based on the future position of the moving object and driving information of the vehicle; and calculating the possibility of collision according to the time to collision.

4. The collision avoidance method of claim 3, wherein the prediction model is a model trained to output a future position of an object using position, velocity, direction, size and type of the object.

5. A collision avoidance device mounted to a vehicle, the device comprising:

a sensor unit configured to detect a forward vehicle;

a communication unit configured to request vehicle-to-vehicle communication with the forward vehicle, and to receive image data and ultrasound data of the forward vehicle;

a processing unit configured to analyze information about a moving object not detected by the vehicle and hidden in a blind spot formed by the forward vehicle based on the image data and the ultrasound data received from the forward vehicle, and to calculate a possibility of collision with the moving object based on the information about the moving object; and a control unit configured to perform one or both of warning notification and collision avoidance control according to the possibility of collision, wherein the sensor unit is configured to:

operate an ultrasonic sensor of the vehicle according to the possibility of collision;

rotate an orientation of a camera of the vehicle toward the moving object according to the possibility of collision; and monitor the moving object using the ultrasonic sensor and the camera.

6. The collision avoidance device of claim 5, wherein the processing unit is configured to analyze the information about the moving object further based on image data and ultrasound data received from another forward vehicle, and wherein the processing unit is configured to recalculate the possibility of collision with the moving object based on both data collected by the vehicle and data received from the forward vehicle when the moving object is detected by the ultrasonic sensor and the camera.

7. The collision avoidance device of claim 5, wherein the processing unit is configured to:

predict a future position of the moving object by using the information about the moving object and a prediction model;

calculate a time to collision (TTC) of the vehicle with the moving object based on the future position of the moving object and driving information of the vehicle; and calculate the possibility of collision according to the time to collision.

8. The collision avoidance device of claim 7, wherein the prediction model is a model trained to output a future position of an object using position, velocity, direction, size and type of the object.

* * * * *